000
United States Patent [19]

Bortolin et al.

[11] Patent Number: 4,690,496

[45] Date of Patent: Sep. 1, 1987

[54] OPTICAL FIBER JOINT WITH REINFORCING FILAMENT AND METHOD OF MAKING SUCH JOINT

[75] Inventors: Bruno Bortolin, Cinisello Balsamo; Sergio Borgonovo, Lomazzo, both of Italy

[73] Assignee: Societa Cavi Pirelli S.p.A., Milan, Italy

[21] Appl. No.: 693,772

[22] Filed: Jan. 23, 1985

[30] Foreign Application Priority Data

Jan. 27, 1984 [IT] Italy ................ 19341 A/84

[51] Int. Cl.⁴ .................................. G02B 6/38
[52] U.S. Cl. .................................. 350/96.21
[58] Field of Search ............... 350/96.20, 96.21, 96.23

[56] References Cited

U.S. PATENT DOCUMENTS 4,290,668  9/1981  Ellis et al. ............... 350/96.21

FOREIGN PATENT DOCUMENTS 2096343  10/1982  United Kingdom .

Primary Examiner—Robert E. Wise
Attorney, Agent, or Firm—Brooks Haidt Haffner & Delahunty

[57] ABSTRACT

A method of forming a connection between a pair of optical fiber cables, each cable having an optical fiber surrounded by a plurality of protective coverings, in which method the optical fiber of each cable is bared by removing the coverings adjacent the cable ends and the optical fibers are joined by conventional cutting and melting. Thereafter, the space between the ends of the coverings are filled by a moisture impervious coating on the bared fibers, longitudinal non-metallic filaments or filament on the coating, helically wound non-metallic filaments or filament around the longitudinal filament or filaments, the helically wound filament or filaments be covered by an adhesive, and an elastomeric layer, which sets up at temperatures which are low with respect to temperatures used to extrude elastomeric materials, around the helically wound filament. The joint so formed is surrounded by a plastic tube. Also, the joint which is made by such method.

11 Claims, 3 Drawing Figures

OPTICAL FIBER JOINT WITH REINFORCING FILAMENT AND METHOD OF MAKING SUCH JOINT

The present invention relates to a method for connecting together two optical fibers of the type having an adherent protective covering which are known as "tight" optical fibers, and to the joint obtained by applying said method.

When providing permanent connections between the extremities of two optical fibers, it is important to limit, as far as possible, any discontinuities in the mechanical and optical characteristics at the junction of the fibers.

In fact, at the junction, the small cable containing the optical fiber, should not be enlarged, stiffened, or otherwise altered in its general characteristics which might interfere with the successive operations which it can undergo, for example, the operation of winding it onto supports, the stranding of the cable with other cables, etc.

Moreover, during the formation of the junction, the fibers are, for a certain period of time, without a protective covering and hence, are subject to alterations and degradations due to mechanical stresses during the joining operation (e.g., the formation of micro-cracks) and to the deposition of water from humid air on the fiber which can penetrate into said micro-cracks, thereby increasing the fragileness of the fiber itself.

Finally, any rebuilding of the protective outer layers normally requires the application of heat which causes an undesirable dimensional change of the fibers and, as a result, when the temperature is thereafter lowered, there can be non-homogeneous or non-uniform, dimensional variations. This gives rise to further degradations in the transmission characteristics of the fiber which, sometimes, are not immediately detectable and consequently are particularly harmful.

The above-mentioned drawbacks are typical of the present day junctions which are made by the techniques of the art, in which the joining is carried out with the introduction of metallic reinforcing elements and the moulding, or hot-extrusion, of the covering plastic material. Hence, at the junction, the resulting cable containing the optical fiber is so enlarged and stiffened as to create problems and drawbacks (for example, during the stranding phase), and the fiber is subjected to excessive degradations in the transmission qualities when operating at low temperatures.

Therefore, one object of the present invention is to provide an improved method for joining two optical fibers, which method does not require the introduction of any inserts or metallic reinforcements so as to prevent degradation of the stranding characteristics of the fiber. The rebuilding of the coverings is accomplished with little heating which not only safeguards the mechanical properties of the fiber when making the junction, but also avoids degrading the transmission and alignment characteristics during the subsequent use of the fibers.

Another object of the present invention is to provide a junction between two optical fibers which is made according to the method of the invention.

In accordance with the method of the invention for joining together two optical fibers of the type having an adherent protective covering, without degrading their stranding characteristics, the extremities of the fibers, stripped of their coverings for a length defining a junction zone, are positioned in abutting relation and are connected by means of melting, and after such said melting, the following steps are carried out:

(1) the fibers are rigidly held in position, while they are kept under tension;

(2) the junction zone is covered with a protective layer of waterproofing material;

(3) at least one longitudinally disposed reinforcing filament and preferably, at least one further filament which is wound helically around the junction zone are applied in the junction zone, the ends of the filaments being fixed to the covering layer of the fibers;

(4) the junction zone is coated with an adhesive;

(5) an elastomeric covering is moulded around the junction zone; and (6) the junction zone is covered with a protective material tube which is fixed in position by an adhesive agent.

Moreover, the invention comprises a junction or joint between two optical fibers having an adherent covering, wherein the fibers are joined together in abutting relationship by melting, characterized by the fact that the junction zone comprises, from the inside towards the outside, a protective layer of waterproofing material on the fibers, reinforcing non-metallic filaments, impregnated with an adhesive, disposed at least longitudinally and preferably also, helicoidally around the protective layer, a moulded elastomeric covering around the filaments, and an outer protective tube fixed in position by an adhesive.

Other objects and advantages of the present invention will be apparent from the following detailed description of the presently preferred embodiments thereof, which description should be considered in conjunction with the accompanying drawings in which.

Figure 3:
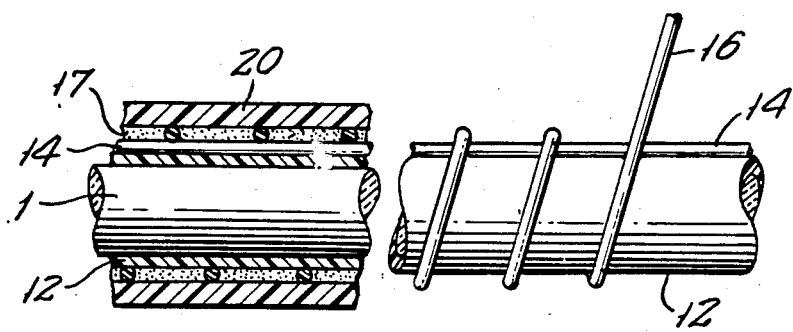

FIG. 3 schematically shows, on the right, the winding of the helicoidal filament and, on the left, a cross-section of the structure of the joint prior to sliding the tube 13 thereon.

Figure 1:
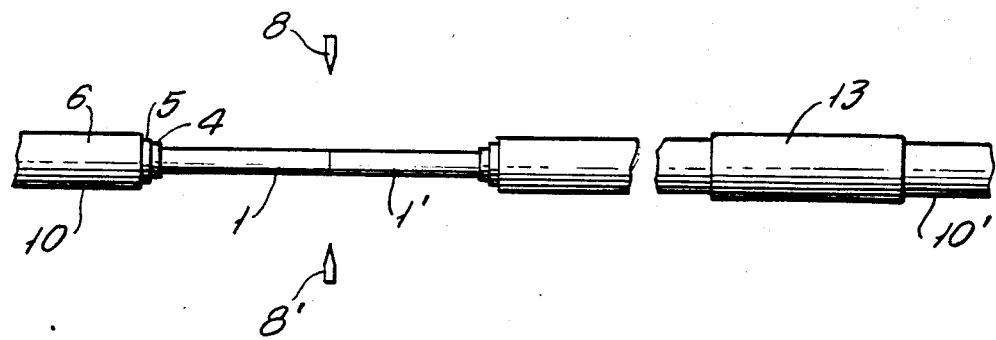
FIG. 1 shows the two bared extremities of the fibers to be joined in abutting relation prior to the melting of the ends thereof.

As shown in FIG. 1, each of the two optical fiber elementary cables (10 and 10') to be joined, is constituted by an optical fiber (1 and 1') around which there are an adherent acrylic covering 4, a silicone-rubber covering 5 and an outer sheath 6 that is made from an extruded material, e.g., nylon.

Each extremity of the fibers (1 and 1') is prepared for joining by stripping off the extruded material sheath 6 for a length of about 50 mm, thereafter removing the silicone-rubber covering 5 and then cutting the fiber which still has its acrylic covering, by means of a cutter which produces a shearing section and provides an end face on the fiber which is smooth and perpendicular to the axis of the fiber.

The fiber extremities are thereupon immersed in an alcohol solution and subjected to ultrasonic vibrations for the purpose of removing the acrylic covering 4 adjacent to the ends thereof and for removing from the fibers any particles of foreign matter which may remain. Over one of the two cables, a small tube 13 of a plastic material, e.g., nylon, is fitted, and such tube 13 will later serve for the covering of the junction or joint. The two extremities of the fibers 1 and 1' are then disposed within a known device, for positioning them and connecting them by melting.

FIG. 1 schematically shows the configuration assumed by the two extremities of the fibers 1 and 1' after their positioning and immediately prior to their union by melting. Said joining takes place, for example, by causing an electric arc to be produced between the electrodes 8 and 9 disposed on a plane perpendicular to the fibers 1 and 1', thereby bringing about a localized fusion of the abutting surfaces of the fibers 1 and 1'.

The so-joined cables 10 and 10' are gripped, by means of an elastic C-shaped clamp 18, which engages portions which are sufficiently spaced apart along the cables, for preventing any misalignment and strains during the succeeding operations and for imparting a slight tensioning to the joined fiber to keep them taut.

Figure 2:
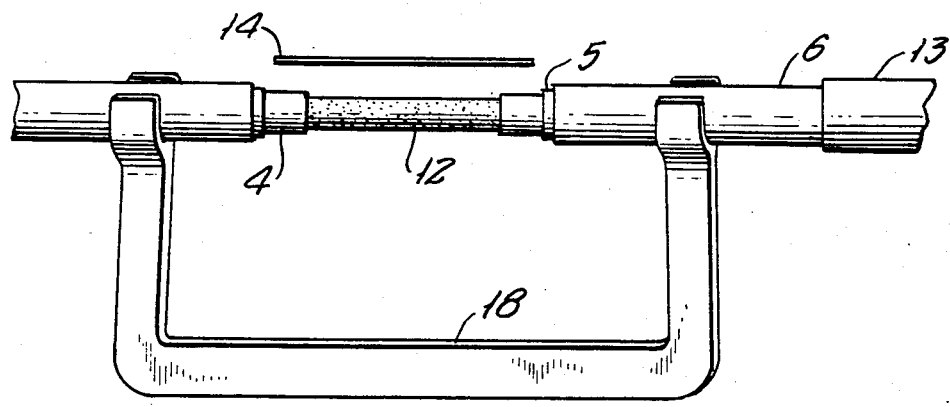
FIG. 2 illustrates a step succeeding the joining operations.

In the example illustrated in FIG. 2, the clamp is applied to the cable while the two arms are maintained slightly compressed, and when the arms are released, the fibers become straight and taut due to the elasticity of the clamp 18. Of course, other forms for the clamp are also possible. For example, the clamp may be of the type provided with an adjusting screw for adjusting the tension applied. In addition to keeping the fibers straight, the clamp also serves as means for manipulating the joined fiber, in a simple and rapid manner, without manually gripping the cables 10 and 10'.

The assembly shown in FIG. 2 is removed from the aligning and joining apparatus and the clamp 18 is mounted in a suitable holding device after which, in the junction zone (by this term is meant substantially the cable portion from which at least one covering layer has been removed), there is applied to the bare fibers 1 and 1' a layer 12 of waterproofing material, e.g., cellulose acetate.

This first protective covering layer 12 has the purpose of protecting and insulating the optical fibers from the outside environment thereby preventing any moisture from settling upon the fiber itself and from eventually penetrating into any micro-cracks which may be formed in the fibers.

At this point, the fibers can be made to undergo a certain degree of bending because they have now been made impermeable by the acetate covering 12 which prevents any penetration of moisture into micro-cracks which may be formed therein.

One or several reinforcing non-metallic, filaments or threads 14 are now disposed longitudinally in the junction zone and are fixed at their extremities, such as by an adhesive, at points situated outside said zone (see FIG. 2), and preferably, at points on the portions of the acrylic covering 4 which have not been removed.

With reference to FIG. 3 (in particular, the right-hand portion), at least one further non-metallic, filament (16) is fixed, at one extremity, to a covering of a cable and thereafter, is helically wound over the junction which, at this point, comprises the joined optical fibers 1 and 1', the acetate covering 12 and the longitudinal filament (or thread) 14. After the winding of the filament 16, the terminal extremity of the filament 16 is secured to the other cable, for example, by means of gluing it to a covering of the other cable. Preferably, the filaments 14 and 16 are aramid fibers of the type sold under the trademark KEVLAR, textile yarns, plastic fibers, or other fibers of a stretch-resistant material.

The purpose of the filaments 14 and 16 is to restore the mechanical resistance of the small cable where the coverings were removed while still retaining its flexibility and without causing any enlargement of the exterior size in the junction zone, which, unavoidably, would occur with the use of metallic reinforcements. It must be kept in mind that the glass (out of which the optical fiber usually is formed) has a coefficient of thermal expansion which is very low with respect to that of the other materials which form the cable. It is this difference which causes mechanical stresses in the fiber with temperature variations. In the junction zone, where the various components are connected to one another in a more rigid manner, the problem is increased. The materials most suited for said filaments are those which are capable of resisting a high specific tensile stress and which, at the same time, have a low coefficient of thermal expansion, such as, for example, a carbon fiber. For this purpose, aramid threads have proved to be particularly effective, since they have a negative coefficient of thermal expansion and oppose the expansion effects of the other materials forming the cable.

By way of example, each of the cables 10 and 10', prior to joining, has a maximum tensile stress on the order of about 5-6 Kg., whereas, at a junction effectuated without reinforcements, the maximum tensile stress drops to values of between 1 and 2 Kg. While these values may prove to be acceptable in some cases, the junction according to the present invention has an increased maximum tensile stress. If an intermediate resistance value is sufficient, only the longitudinal filaments 14 may be used. By applying a longitudinal filament 14 and a helicoidal filament 16, the resistance of the junction may be increased to between 4 and 5 Kg., i.e., very close to resistance of the original cable 10 or 10'.

Although it is also possible to use several longitudinal filaments 14, as well as several helicoidal filaments 16, an increase in the number of filaments does not substantially improve the characteristics of the junction. When several filaments 14 are used, it is preferred that they be equally spaced circumferentially of the fibers 1 and 1'. Preferably, the helical turns of the filament 16 are equally spaced axially of the fibers, and they may have a spacing approximately equal, or equal, to the diameters of the fibers 1 and 1' as illustrated in FIG. 3.

Referring now to the left-hand portion of FIG. 3, which illustrates a cross-section of the finished structure prior to sliding the tube 13 over the joint, the further operations will now be described. The junction zone is covered with a layer of adhesive 17, and any surplus is removed. Thereafter, by applying a low and controlled amount of heat, the adhesive is dried.

At this point, the junction structure is strong enough to be able to withstand small amounts of flexing. For this reason, the clamp 18 is removed, and thereafter, there follows the step of applying a silicone rubber layer 20, or some other suitable elastomeric covering, by means of moulding. The silicone rubber, which is treated appropriately for eliminating any gas bubbles and which is also kept under vacuum, is now applied by means of a mould inside which the junction zone is located. The rubber is formed around the junction zone with a restricted and controlled application of a low amount of heat so as to form the covering 20. Although an elastomer which sets up above room temperature may be employed if the setting temperature is relatively low as compared to temperatures required for extrusion processes, it will be apparent that an elastomer which sets up without the application of heat may be used. An adhesive, e.g., a cyano-acrylate, is also spread over the covering 20, and the nylon-tube 13 is caused to slide over the covering 20 so as to completely cover the joint and to become secured to it. For the sake of simplicity, these last mentioned steps are not illustrated in the drawings.

The junction or joint is thus completed, and it presents optimum characteristics since it is devoid of any metal reinforcing inserts or metallic elements. Also, the joint itself does not have any enlargements or stiffenings which would render discontinuous the mechanical characteristics of the cable. The resulting cable can also be stranded with other cables and is sufficiently strong due to the reinforcing filaments 14 and 16. Moreover, the fibers themselves have not undergone any alterations of either a mechanical or chemical nature. In particular, since the steps of extruding a restoring material have been avoided, the fibers do not undergo any of those damaging stresses of a thermal type which are to be found in junctions according to the conventional techniques and which, after a lowering in the temperature, could cause compressive forces to act upon the facing fibers, thereby increasing the losses already introduced by the junction itself.

Although the invention has been described with particular reference to preferred embodiments, it will be apparent to those skilled in the art that various modifications may be made without departing from the principles of the invention which include the making of a joint for optical fibers of the tight type without the introduction therein of any metallic reinforcing inserts or elements and without the restoring of the covering layers using high temperature processes.

The embodiments of the invention in which an exclusive property or privilege is claimed are defined as follows:

1. A joint between two optical fiber cables, each cable comprising an optical fiber surrounded by a plurality of coverings, said joint comprising:
   the end of the optical fiber of one said cable mechanically connected to the end of the optical fiber of the other said cable;
   ends of said protective coverings axially spaced from each other and axially spaced from the connected ends of the optical fibers;
   a protective layer of moisture impervious material around the connected ends of the fibers and extending axially on each side of said ends;
   a plurality of non-metallic filaments on said protective layer and secured thereto by an adhesive, at least one of said filaments extending axially of the fibers and another of said filaments being wound around said fibers; and
   a layer of elastomeric material surrounding said filaments.

2. A joint as set forth in claim 1 further comprising a tube around said layer of elastomeric material and secured in axial relation thereto.

3. A joint as set forth in claim 2 wherein said tube is a tube of plastic material secured to said layer of elastomeric material by an adhesive.

4. A joint as set forth in claim 1 wherein said filaments are impregnated with said adhesive.

5. A joint as set forth in claim 1 wherein said filaments a negative temperature coefficient.

6. A joint as set forth in claim 5 wherein said filament is an aramid filament.

7. A method of making a joint of claim 1 comprising the steps of:
   removing the coverings from the optical fibers adjacent the ends of the cables to expose axial length of the surfaces of the fibers;
   mechanically joining the ends of the optical fibers;
   while maintaining the fibers under tension, applying a protective layer of moisture-impervious material to the exposed surfaces of the fibers, applying a plurality of non-metallic filaments to the protective layer, at least one of said filaments being applied to said protective layer with its length extending axially of said fibers and another of said filaments being wound helicoidally around said protective layer and securing the respective ends of the filaments to a covering of a respective cable and applying an adhesive to the filaments and the protective layer and causing the adhesive to set; and
   forming a layer of an elastomeric material around the filaments and the adhesive.

8. A method as set forth in claim 7 wherein the ends of the optical fibers are mechanically joined by abutting the end surfaces thereof and melting such surfaces.

9. A method as set forth in claim 8 further comprising surrounding the layer of elastomeric material with a tube and securing said tube to said layer of elastomeric material.

10. A method as set forth in claim 7 wherein said filaments have a tensile strength greater than the tensile strength of said layer of elastomeric material and a temperature coefficient of expansion substantially equal to the temperature coefficient of expansion of said fibers.

11. A method as set forth in claim 10 wherein said filaments are made of a material having a negative temperature coefficient of expansion.

* * * * *

UNITED STATES PATENT AND TRADEMARK OFFICE
CERTIFICATE OF CORRECTION

PATENT NO. : 4,690,496

DATED : September 1, 1987

INVENTOR(S) : Bortolin et al

It is certified that error appears in the above-identified patent and that said Letters Patent is hereby corrected as shown below:

Col. 6, line 12, before "a" insert --have--.

Signed and Sealed this

Fifth Day of January, 1988

Attest:

DONALD J. QUIGG

*Attesting Officer*  *Commissioner of Patents and Trademarks*